United States Patent
Goto et al.

(10) Patent No.: US 10,385,417 B2
(45) Date of Patent: Aug. 20, 2019

(54) HEAVY WALL ELECTRIC RESISTANCE WELDED STEEL PIPE FOR LINE PIPE AND METHOD FOR MANUFACTURING THE SAME

(71) Applicant: JFE STEEL CORPORATION, Tokyo (JP)

(72) Inventors: Sota Goto, Tokyo (JP); Shunsuke Toyoda, Tokyo (JP); Takatoshi Okabe, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 756 days.

(21) Appl. No.: 14/903,804

(22) PCT Filed: Jul. 8, 2014

(86) PCT No.: PCT/JP2014/003604
§ 371 (c)(1),
(2) Date: Jan. 8, 2016

(87) PCT Pub. No.: WO2015/004901
PCT Pub. Date: Jan. 15, 2015

(65) Prior Publication Data
US 2016/0153063 A1 Jun. 2, 2016

(30) Foreign Application Priority Data
Jul. 9, 2013 (JP) .................. 2013-143498

(51) Int. Cl.
*C21D 9/08* (2006.01)
*C21D 9/50* (2006.01)
(Continued)

(52) U.S. Cl.
CPC .......... *C21D 9/085* (2013.01); *B23K 11/0873* (2013.01); *C21D 1/42* (2013.01);
(Continued)

(58) Field of Classification Search
CPC ............ C21D 9/08; C21D 9/085; C21D 9/50
See application file for complete search history.

(56) References Cited

U.S. PATENT DOCUMENTS 8,070,887 B2    12/2011    Asahi et al.
2011/0284137 A1    11/2011    Kami

FOREIGN PATENT DOCUMENTS

CA    2832021 A1 *    2/2013    ........... C21D 8/0226
CA    2832021 A1    2/2013
(Continued)

OTHER PUBLICATIONS

Korean Office Action for Korean Application No. 10-2016-7002825, dated Nov. 30, 2016, including Concise Statement of Relevance of Office Action, 7 pages.
(Continued)

*Primary Examiner* — Weiping Zhu
(74) *Attorney, Agent, or Firm* — RatnerPrestia

(57) ABSTRACT

By using, as a raw material, a thick hot-rolled steel sheet having a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less and satisfying the condition that a carbon equivalent Ceq is 0.25% or more and 0.50% or less, a microstructure including a bainitic ferrite phase and/or a bainite phase, a high strength of 52 ksi or more in terms of yield strength and a high toughness of −45° C. or lower in terms of fracture transition temperature vTrs, and satisfying the condition that the ratio of the average crystal grain size of the coarsest-grain portion to the average crystal grain size of the finest-grain portion is 2.0 or less in every portion in the wall thickness direction is obtained.

24 Claims, 1 Drawing Sheet

(51) Int. Cl.

| | |
|---|---|
| *C22C 38/12* | (2006.01) |
| *C22C 38/58* | (2006.01) |
| *C22C 38/04* | (2006.01) |
| *C21D 8/02* | (2006.01) |
| *C21D 1/42* | (2006.01) |
| *B23K 11/087* | (2006.01) |
| *C21D 6/00* | (2006.01) |
| *C21D 8/10* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/14* | (2006.01) |
| *C22C 38/16* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/38* | (2006.01) |

(52) U.S. Cl.
CPC ............ *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/105* (2013.01); *C21D 9/08* (2013.01); *C21D 9/50* (2013.01); *C21D 9/505* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/38* (2013.01); *C22C 38/58* (2013.01); *C21D 2211/002* (2013.01); *Y02P 10/253* (2015.11)

(56) References Cited

FOREIGN PATENT DOCUMENTS

| | | |
|---|---|---|
| CA | 2881372 A1 | 4/2014 |
| CN | 102308013 | 1/2012 |
| CN | 102666899 | 9/2012 |
| EP | 1354973 | 10/2003 |
| EP | 1462535 | 9/2004 |
| EP | 2395122 | 12/2011 |
| EP | 2505681 | 10/2012 |
| EP | 2692875 | 2/2014 |
| EP | 2735622 | 5/2014 |
| JP | S5925932 | 2/1984 |
| JP | H0441619 | 2/1992 |
| JP | 06158177 | 6/1994 |
| JP | 06220547 | 8/1994 |
| JP | 0742509 | 2/1995 |
| JP | 08295934 | 11/1996 |
| JP | 2002302716 | 10/2002 |
| JP | 2003293089 | 10/2003 |
| JP | 2005281838 | 10/2005 |
| JP | 2005290546 | 10/2005 |
| JP | 2007254797 | 10/2007 |
| JP | 2013014844 A | 1/2013 |
| KR | 100558429 | 3/2006 |
| WO | 2010087511 | 8/2010 |
| WO | 2012133558 | 10/2012 |
| WO | 2013011791 | 1/2013 |

OTHER PUBLICATIONS

Canadian Office Action for Canadian Application No. 2,914,312, dated Jan. 10, 2017, 4 pages.
Extended European Search Report dated Jul. 5, 2016 for European Application No. 14822859.6, 12 pages.
Chinese Search Report dated Jul. 15, 2016 for Chinese Application No. 2014800391732, 2 pages.
Korean Notice of Allowance for Korean Application No. 10-2016-7002825, dated Sep. 26, 2017.
International Search Report for International Application No. PCT/JP2014/003604 dated Oct. 14, 2014.
Written Opinion of the International Searching Authority for International Application No. PCT/JP2014/003604.
Canadian Office Action for Canadian Application No. 2,914,312, dated Oct. 10, 2017, 8 pages.
European Communication for European Application No. 14 822 859.6, dated Oct. 10, 2017, 6 pages.
European Search Report for European Application No. 14 822 859.6-1373, dated Apr. 28, 2017—7 Pages.

* cited by examiner

HEAVY WALL ELECTRIC RESISTANCE WELDED STEEL PIPE FOR LINE PIPE AND METHOD FOR MANUFACTURING THE SAME

CROSS REFERENCE TO RELATED APPLICATIONS

This is the U.S. National Phase application of PCT/JP2014/003604, filed Jul. 8, 2014, which claims priority to Japanese Patent Application No. 2013-143498, filed Jul. 9, 2013, the disclosures of each of these applications being incorporated herein by reference in their entireties for all purposes.

TECHNICAL FIELD OF THE INVENTION

The present invention relates to a heavy wall electric resistance welded steel pipe for a line pipe, and in particular, to a heavy wall electric resistance welded steel pipe for a line pipe having a high strength of Grades X52 to X80 (yield strength YS: 360 MPa to 555 MPa) specified by the API (American Petroleum Institute) and high toughness in both a base metal zone and an electric resistance weld zone and a method for manufacturing the pipe. Herein, "heavy wall" refers to a case where a wall thickness is 20 mm or more.

BACKGROUND OF THE INVENTION

Nowadays, as deep-sea oil wells and gas wells are developed, there is a strong demand for high-strength heavy wall steel pipes for offshore pipelines and oil country tubular goods. Furthermore, steel pipes to be used in cold areas such as the North Sea and Alaska are strongly required to have satisfactory low temperature reliability of a weld zone of an electric resistance welded steel pipe, in particular, brittle fracture initiation resistance at a low temperature.

Usually, in a weld zone (electric resistance weld zone) of an electric resistance welded steel pipe formed as a result of performing electric resistance welding, strength (hardness) is higher and toughness is lower than in a base metal zone due to rapid heating and rapid quenching when welding is performed. In order to solve such problems in an electric resistance weld zone, recently, techniques for recovering (increasing) toughness in an electric resistance weld zone (weld zone) to the level of that in a base metal as a result of improving microstructure in an electric resistance weld zone by performing in-line heating and cooling after welding (electric resistance welding) has been performed on the electric resistance weld zone have been proposed.

For example, Patent Literature 1 describes a method for manufacturing an electric resistance welded steel pipe excellent in terms of low temperature toughness, the method including heating the electric resistance weld zone of an electric resistance welded steel pipe having a chemical composition containing C: 0.05% to 0.20%, Si: 0.3% or less, and Mn: 0.50% to 2.00% as basic constituent chemical elements and further containing one, two, or all of Nb: 0.01% to 0.10%, V: 0.01% to 0.10%, Ti: 0.01% to 0.05%, and the balance being Fe and inevitable impurities at a temperature of 850° C. to 1000° C., starting rapid quenching at a temperature equal to or higher than the $Ar_3$ transformation point at a cooling rate of more than 30° C./s and 100° C./s or less, ending cooling at a temperature of ($Ar_1$ –50° C.) to ($Ar_1$ –100° C.), and then performing weak cooling. In Patent Literature 1, it is said that it is possible to achieve excellent toughness in an electric resistance weld zone substantially equivalent to that in a base metal without performing reheating (tempering) after cooling has been performed.

In addition, Patent Literature 2 describes a method for manufacturing a high-toughness electric resistance welded steel pipe, the method including heating the weld zone (electric resistance weld zone) of an electric resistance welded steel pipe having a chemical composition containing C: 0.10% or less, Si: 0.5% or less, Mn: 0.4% to 1.6%, P: 0.025% or less, S: 0.010% or less, Nb: 0.01% to 0.08%, Ti: 0.01% to 0.07%, V: 0.005% to 0.07%, and the balance being Fe and inevitable impurities at a temperature of 850° C. to 1050° C., cooling the heated weld zone at a cooling rate of 5° C./s to 20° C./s, and, optionally, further performing tempering by heating the cooled weld zone at a temperature of 550° C. or lower and by cooling the heated weld zone. It is said that, with this method, it is possible to achieve both high strength and high toughness in an electric resistance weld zone substantially equivalent to those in a base metal.

In addition, Patent Literature 3 describes a method for performing a heat treatment on a heavy wall electric resistance welded steel pipe. The technique described in Patent Literature 3 is a method for performing a heat treatment on a heavy wall electric resistance welded steel pipe, the method including, when a continuous heat treatment is performed on the weld zone of a heavy wall electric resistance welded steel pipe by using a high-frequency induction heating device, first performing first heating on the weld zone such that the inner surface of the weld zone has a temperature of (the $Ar_3$ point+50° C.) or higher, then cooling the heated weld zone with water or air such that the outer surface of the weld zone has a temperature equal to or lower than the end temperature of bainite transformation of the heated material, and then performing second heating at a temperature with which it is possible for the $Ac_3$ transformation zone to entirely cover the generating area of bainite transformation due to the first heating and cooling and which is equal to or lower than a temperature at which a bainite microstructure is generated. It is said that, with this method, it is possible to manufacture heavy wall electric resistance welded steel pipe having a weld zone quite excellent in terms of workability, toughness, and corrosion resistance, which are often used, without adding a process which is complex and requires a long treatment time.

PATENT LITERATURE

PTL 1: Japanese Examined Patent Application Publication No. 7-42509

PTL 2: Japanese Unexamined Patent Application Publication No. 6-158177

PTL 3: Japanese Unexamined Patent Application Publication No. 6-220547

SUMMARY OF THE INVENTION

However, in the case of the techniques according to Patent Literature 1 and Patent Literature 2, there is a problem in that it is not possible to provide an electric resistance weld zone having high strength and high toughness to an electric resistance weld zone of a heavy wall electric resistance welded steel pipe having a wall thickness of 20 mm or more by using an in-line process without additional enhancement of equipment for heating, which results in an economic disadvantage. In addition, in the case of a heavy wall electric resistance welded steel pipe having a wall thickness of 20 mm or more, there is a problem in that it is difficult to realize a cooling rate of more than 30° C./s and 100° C./s or less in the whole region in the wall thickness direction as described in Patent Literature 1. In addition, in the case where a heavy wall electric resistance welded steel pipe having a wall thickness of 20 mm or more is cooled at a cooling rate of 5° C./s to 20° C./s as described in Patent Literature 2, there is a problem in that, since a ferrite+pearlite microstructure tends to be formed in an electric resistance weld zone, strength tends to decrease in the electric resistance weld zone.

In addition, in Patent Literature 3, only an example of a comparatively large wall thickness of 16.0 mm is given, and there is no mention of a heavy wall electric resistance welded steel pipe having a wall thickness of 20 mm or more. Moreover, in the case of the technique according to Patent Literature 3, it is necessary to use a complex process in which, for example, a heat treatment is performed twice. In the case where the technique according to Patent Literature 3 is applied to a heavy wall electric resistance welded steel pipe having a wall thickness of 20 mm or more, since it is necessary to use a complex process in which, for example, a heat treatment is performed by reheating a cooled material at a temperature with which it is possible for the $Ac_3$ transformation zone to entirely cover the generating area of bainite transformation due to the first heating and cooling, many heating devices, long heating zones, long cooling zones, and the like are necessary, which results in an economic disadvantage. In addition, in the case of the technique according to Patent Literature 3, there is a problem in that it is not possible to perform a heat treatment for providing an electric resistance weld zone having high strength and high toughness to an electric resistance weld zone of a heavy wall electric resistance welded steel pipe having a wall thickness of 20 mm or more by using an in-line process without decreasing a pipe production speed, unless, for example, heating equipment is additionally enhanced.

An object of aspects of the present invention is, by solving the problems with conventional techniques described above, to provide a heavy wall electric resistance welded steel pipe for a line pipe having a high strength of Grades X52 to X80 specified by the API and high toughness in both a base metal zone and an electric resistance weld zone and to provide a method for manufacturing the line pipe. In accordance with aspects of the present invention, there is a particular aim to increase toughness in an electric resistance weld zone by performing a heat treatment only once on the electric resistance weld zone without performing tempering. Herein, "heavy wall" refers to a case where wall thickness is 20 mm or more. In addition, herein, "high toughness" refers to a case where critical opening displacement δ is 0.80 mm or more at a testing temperature of −25° C. in a CTOD test (crack-tip-opening-displacement test).

The present inventors, in order to achieve the object described above, first conducted diligent investigations regarding various factors influencing toughness in the electric resistance weld zone of a heavy wall electric resistance welded steel pipe having a wall thickness of 20 mm or more.

As a result, it was found that, in the case where the toughness in the electric resistance weld zone is estimated by CTOD test, it is necessary to fill the whole region in the wall thickness direction of an electric resistance weld zone with a microstructure excellent in terms of toughness in order to improve toughness in the electric resistance weld zone, that it is necessary to fill the whole region of an electric resistance weld zone with a microstructure including a bainitic ferrite phase and/or a bainite phase by performing a heat treatment only once in order to improve toughness in the electric resistance weld zone by performing a heat treatment only once without performing a tempering treatment, and that it is not possible to achieve high toughness without performing a tempering treatment in the case of a microstructure in which martensite phase or pearlite is mixed. Therefore, it was found that, as illustrated in cooling condition given in FIG. 2, it is necessary to perform controlled cooling such that the temperature of the whole region of an electric resistance weld zone passes through a range in which a bainitic ferrite phase and/or a bainite phase are formed without passing through a range in which martensite or pearlite is formed. Here, in FIG. 2, M represents martensite, BF represents bainitic ferrite, F represents ferrite, and P represents pearlite.

In-line heat treatment on an electric resistance weld zone is, due to facility conditions, generally performed in such a manner that heating is performed from the outer surface of a pipe by using a heating device such as a high-frequency heating device and that cooling is performed from the outer surface of the pipe by using a cooling device using, for example, water (water cooling device). Therefore, since a temperature distribution occurs in the wall thickness direction of a pipe when heating is performed, it is not possible to prevent a grain size distribution from occurring in the wall thickness direction.

Therefore, the present inventors diligently conducted investigations regarding various factors influencing toughness in an electric resistance weld zone under such restraint conditions, and as a result, found that, by strictly controlling the heating temperature and cooling rates of the outer surface and inner surface of an electric resistance welded steel pipe within appropriate ranges when a heat treatment is performed on an electric resistance weld zone, it is possible to fill the whole region of the electric resistance weld zone with a microstructure including a bainitic ferrite phase and/or a bainite phase, and that, since it is possible to form a uniform microstructure in which the ratio of the average crystal grain size of a portion in the wall thickness direction having the largest grain size (the average crystal grain size of the coarsest-grain portion) to the average crystal grain size of a portion in the wall thickness direction having the smallest grain size (the average crystal grain size of the finest-grain portion), that is, (the average crystal grain size of the coarsest-grain portion)/(the average crystal grain size of the finest-grain portion) is 2.0 or less, it is possible to improve toughness in the electric resistance weld zone of an electric resistance welded steel pipe having a wall thickness of 20 mm or more by performing a heat treatment only once (by using a one-cycle heating and cooling treatment). In the case where (the average crystal grain size of the coarsest-grain portion)/(the average crystal grain size of the finest-grain portion) is more than 2.0, since a portion having a large grain size tends to be the origination of a brittle crack, it is not possible to achieve desired high toughness due to a deterioration in toughness.

The present invention has been completed on the basis of the findings described above and additional investigations. That is to say, the subject matter of aspects of the present invention is as follows.

[1] A heavy wall electric resistance welded steel pipe for a line pipe, the steel pipe being a heavy wall electric resistance welded steel pipe which is formed from a thick hot-rolled steel sheet as a raw material and which has a base metal zone and an electric resistance weld zone, in which the base metal zone has a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less and satisfying the condition that a carbon equivalent Ceq defined by equation (1) below is 0.25% or more and 0.50% or less, and a microstructure including a bainitic ferrite phase and/or a bainite phase, in which the base metal zone has a high strength of 360 MPa or more in terms of yield strength and a high toughness of −45° C. or lower in terms of fracture transition temperature vTrs in a Charpy impact test, in which the electric resistance weld zone has a microstructure including a bainitic ferrite phase and/or a bainite phase and satisfying the condition that the ratio of the average crystal grain size of a portion in the wall thickness direction having the largest grain size to the average crystal grain size of a portion in the wall thickness direction having the smallest grain size, that is, (the average crystal grain size of the coarsest-grain portion)/(the average crystal grain size of the finest-grain portion) is 2.0 or less in every portion in the wall thickness direction, and in which the electric resistance weld zone has high toughness, and 0.80 mm or more in terms of critical opening displacement δ at a testing temperature of −25° C. in a CTOD test.

$$Ceq\ (\%) = C + Mn/6 + (Cr + Mo + V)/5 + (Cu + Ni)/15 \qquad (1),$$

where C, Mn, Cr, Mo, V, Cu, Ni respectively represent the contents of the corresponding chemical elements (mass %).

[2] The heavy wall electric resistance welded steel pipe for a line pipe according to item [1], in which the chemical composition is a chemical composition containing, by mass %, C: 0.02% or more and 0.10% or less, Si: 0.05% or more and 0.30% or less, Mn: 0.80% or more and 2.00% or less, P: 0.030% or less, S: 0.0050% or less, Nb: 0.010% or more and 0.100% or less, Ti: 0.001% or more and 0.025% or less, Al: 0.01% or more and 0.08% or less, Ca: 0.0005% or more and 0.0050% or less, and the balance being Fe and inevitable impurities and satisfying the condition that a carbon equivalent Ceq defined by equation (1) above is 0.25% or more and 0.50% or less.

[3] The heavy wall electric resistance welded steel pipe for a line pipe according to item [2], in which the chemical composition further contains, by mass %, one, two, or more selected from among Cu: 0.5% or less, Ni: 0.5% or less, Cr: 0.5% or less, Mo: 0.5% or less, and V: 0.10% or less.

[4] The heavy wall electric resistance welded steel pipe for a line pipe according to any one of items [1] to [3], in which the average crystal grain size of the finest-grain portion is 10 μm or less.

[5] A method for manufacturing a heavy wall electric resistance welded steel pipe for a line pipe, the method being a method for manufacturing a heavy wall electric resistance welded steel pipe including using a heavy wall electric resistance welded steel pipe as a starting material and performing an in-line heat treatment process for an electric resistance weld zone on the electric resistance weld zone of the heavy wall electric resistance welded steel pipe, in which the heavy wall electric resistance welded steel pipe as the starting material is a high-strength heavy wall electric resistance welded steel pipe having a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less and satisfying the condition that a carbon equivalent Ceq defined by equation (1) below is 0.25% or more and 0.50% or less, a microstructure including a bainitic ferrite phase and/or a bainite phase in every portion in the wall thickness direction, and having a high strength of 360 MPa or more in terms of yield strength and a high toughness of −45° C. or lower in terms of fracture transition temperature vTrs in a Charpy impact test in every portion in the wall thickness direction, in which the heat treatment process for an electric resistance weld zone is a process including performing a heat treatment for an electric resistance weld zone such that every portion in the wall thickness direction of the electric resistance weld zone has a temperature of 850° C. or higher and 1150° C. or lower and performing a cooling treatment for an electric resistance weld zone to a cooling stop temperature of 550° C. or lower such that an average cooling rate is 10° C./s or more and 70° C./s or less in every portion in the wall thickness direction of the electric resistance weld zone, and in which the electric resistance weld zone has high toughness, and 0.80 mm or more in terms of critical opening displacement δ at a testing temperature of −25° C. in a CTOD test.

$$Ceq\ (\%) = C + Mn/6 + (Cr + Mo + V)/5 + (Cu + Ni)/15 \qquad (1),$$

where C, Mn, Cr, Mo, V, Cu, Ni respectively represent the contents of the corresponding chemical elements (mass %).

[6] The method for manufacturing a heavy wall electric resistance welded steel pipe for a line pipe according to item [5], in which the heat treatment process for an electric resistance weld zone is a process using an induction heating device and a water cooling device which are placed on the outer surface side of the heavy wall electric resistance welded steel pipe, in which the heat treatment for an electric resistance weld zone is a treatment including performing heating such that an outer surface temperature of the steel pipe is 1150° C. or lower and such that an inner surface temperature of the steel pipe is 830° C. or higher, and in which the cooling treatment for an electric resistance weld zone is a treatment including performing cooling such that an average cooling rate is 70° C./s or less in terms of outer surface temperature of the steel pipe when an outer surface temperature of the steel pipe is 800° C. or lower and 500° C. or higher and such that an average cooling rate is 10° C./s or more in terms of inner surface temperature of the steel pipe when an inner surface temperature of the steel pipe is 750° C. or lower and 650° C. or higher.

[7] The method for manufacturing a heavy wall electric resistance welded steel pipe for a line pipe according to item [6], in which the cooling device is a device using cooling water, in which a water flow rate of the cooling water is 1.2 m³/m² min or more and 5.0 m³/m² min or less, and in which a cooling width is ±50 mm or more in the circumferential direction from the center of the electric resistance weld zone.

[8] The method for manufacturing a heavy wall electric resistance welded steel pipe for a line pipe according to any one of items [5] to [7], in which the chemical composition is a chemical composition containing, by mass %, C: 0.02% or more and 0.10% or less, Si: 0.05% or more and 0.30% or less, Mn: 0.80% or more and 2.00% or less, P: 0.030% or less, S: 0.0050% or less, Nb: 0.010% or more and 0.100% or less, Ti: 0.001% or more and 0.025% or less, Al: 0.01% or more and 0.08% or less, Ca: 0.0005% or more and 0.0050% or less, and the balance being Fe and inevitable impurities and satisfying the condition that a carbon equivalent Ceq defined by equation (1) above is 0.25% or more and 0.50% or less.

[9] The method for manufacturing a heavy wall electric resistance welded steel pipe for a line pipe according to item [8], in which the chemical composition further contains, by mass %, one, two, or more selected from among Cu: 0.5% or less, Ni: 0.5% or less, Cr: 0.5% or less, Mo: 0.5% or less, and V: 0.10% or less.

[10] The method for manufacturing a heavy wall electric resistance welded steel pipe for a line pipe according to any one of items [5] to [9], in which the high-strength heavy wall electric resistance welded steel pipe is an electric resistance welded steel pipe which is formed from a high-strength thick hot-rolled steel sheet as a raw material, and in which the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

According to aspects of the present invention, it is possible to manufacture a heavy wall electric resistance welded steel pipe for a line pipe having a high strength of Grades X52 to X80 specified by the API (yield strength YS of 360 MPa or more and 705 MPa or less) and high toughness in both a base metal zone and an electric resistance weld zone easily and inexpensively without additional special enhancement of equipment. Also, according to aspects of the present invention, by performing a heat treatment (heating and cooling treatment) only once without performing a two-step heat treatment, it is possible to fill the whole thickness of an electric resistance weld zone with a microstructure including a bainitic ferrite phase and/or a bainite phase, which is excellent in terms of toughness. Accordingly, it is possible to easily obtain such an effect that high toughness, and 0.80 mm or more in terms of critical opening displacement δ at a testing temperature of −25° C. in a CTOD test is achieved.

DETAILED DESCRIPTION OF EXEMPLARY EMBODIMENTS OF THE INVENTION

Figure 1:
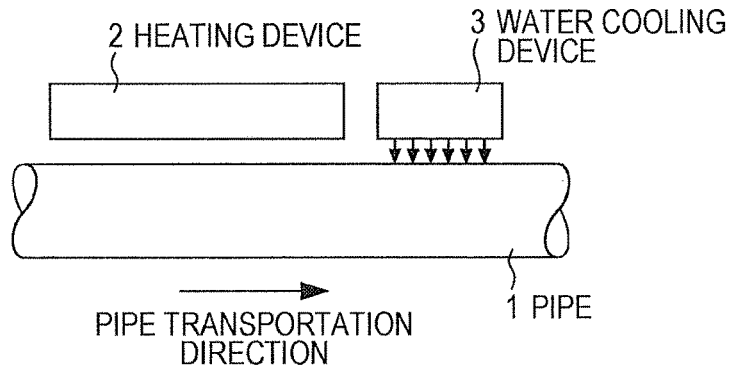
FIG. 1 is a diagram illustrating an example of apparatus arrangement used for performing a heat treatment on an electric resistance weld zone in accordance with aspects of the present invention.
Figure 2:
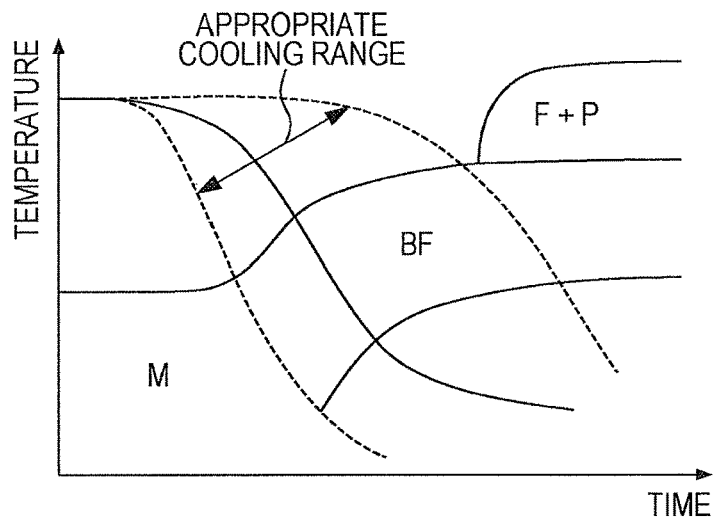
FIG. 2 is a pattern diagram illustrating an appropriate cooling range for a heat treatment performed on an electric resistance weld zone in accordance with aspects of the present invention.

The heavy wall electric resistance welded steel pipe according to aspects of the present invention is a heavy wall electric resistance welded steel pipe which is formed from a thick hot-rolled steel sheet as a raw material preferably by using a pipe production process including performing continuous roll forming using plural rolls in order to obtain an approximate cylindrical shape and performing electric resistance welding and which has a base metal zone and an electric resistance weld zone.

The thick hot-rolled steel sheet as a raw material has a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less, or more preferably, P: 0.030% or less, S: 0.0050% or less, Ti: 0.001% or more and 0.025% or less, Al: 0.01% or more and 0.08% or less, and Ca: 0.0005% or more and 0.0050% or less, or optionally one, two, or more selected from among Cu: 0.5% or less, Ni: 0.5% or less, Cr: 0.5% or less, Mo: 0.5% or less, and V: 0.10% or less, and the balance being Fe and inevitable impurities and satisfying the condition that a carbon equivalent Ceq defined by equation (1) below is 0.25% or more and 0.50% or less.

$$Ceq\ (\%) = C + Mn/6 + (Cr + Mo + V)/5 + (Cu + Ni)/15 \quad (1),$$

(where C, Mn, Cr, Mo, V, Cu, Ni respectively represent the contents of the corresponding chemical elements (mass %)).

First, the reasons for the limitations on the chemical composition will be described. Hereinafter, mass % is simply represented by %, unless otherwise noted.

C: 0.02% or more and 0.10% or less

C is a chemical element which significantly contributes to an increase in the strength of a steel pipe. In order to realize such an effect, it is necessary that the C content be 0.02% or more. On the other hand, in the case where the C content is more than 0.10%, since the formation of second hard phases such as pearlite and martensite is promoted, there is a deterioration in toughness. In addition, in the case where the C content is more than 0.10%, since there is an excessive increase in the strength (hardness) of a bainite phase, there is a deterioration in toughness. Therefore, the C content is limited to the range of 0.02% or more and 0.10% or less, or preferably 0.03% or more and 0.08% or less.

Si: 0.05% or more and 0.30% or less

Si is a chemical element which contributes to an increase in the strength of a steel pipe as a result of forming a solid solution in steel and which contributes to decreasing scale-off quantity when hot rolling is performed. In order to realize such effects, it is necessary that the Si content be 0.05% or more. Here, Si, along with Mn oxides, forms eutectic oxides having high viscosity. In the case where the Si content is less than 0.05%, since the Mn concentration in the eutectic oxides is relatively high, the melting point of the eutectic oxides becomes higher than the liquid steel temperature, which results in a deterioration in toughness in an electric resistance weld zone because oxides tend to remain in the electric resistance weld zone. On the other hand, in the case where the Si content is more than 0.30%, since the formation of red scale becomes marked, there is a deterioration in the aesthetic surface appearance quality of a steel pipe (steel sheet), and there is a deterioration in the uniformity of the properties of a steel pipe (steel sheet) due to the non-uniformity of cooling when hot rolling is performed. In addition, in the case where the Si content is more than 0.30%, since the Si concentration in the eutectic oxides is relatively high, the melting point of the eutectic oxides becomes higher than the liquid steel temperature and there is an increase in the amount of oxides, and there is a deterioration in toughness in an electric resistance weld zone because oxides tend to remain in the electric resistance weld zone. Therefore, the Si content is limited to be 0.05% or more and 0.30% or less, or preferably 0.10% or more and 0.25% or less.

Mn: 0.80% or more and 2.00% or less

Mn is a chemical element which contributes to an increase in the strength of a steel pipe through solute strengthening as a result of forming a solid solution in steel and which contributes to an improve in the strength and toughness of a steel pipe through transformation strengthening as a result of an increase in hardenability. In order to realize such effects, it is necessary that the Mn content be 0.80% or more. Mn, along with Si oxides, forms eutectic oxides having high viscosity. In the case where the Mn content is less than 0.80%, since the Si concentration in the eutectic oxides is relatively high, the melting point of the oxides becomes higher than the liquid steel temperature, which results in a deterioration in toughness in an electric resistance weld zone because oxides tend to remain in the electric resistance weld zone. On the other hand, in the case where the Mn content is more than 2.00%, since the Mn concentration in the eutectic oxides is relatively high, the melting point of the eutectic oxides becomes higher than the liquid steel temperature and there is an increase in the amount of oxides, which results in a deterioration in toughness in the electric resistance weld zone because oxides tend to remain in the electric resistance weld zone. In addition, in the case where the Mn content is more than 2.00%, since there is an excessive increase in hardenability, martensite phase tends to be formed, which results in a deterioration in toughness. Therefore, the Mn content is limited to the range of 0.80% or more and 2.00% or less, or preferably 0.80% or more and 1.80% or less.

Nb: 0.010% or more and 0.100% or less

Nb is a chemical element which contributes to an increase in the strength of a steel sheet as the raw material for a steel pipe as a result of being finely precipitated in the form of Nb carbonitrides when hot rolling is performed in a steel sheet manufacturing process. In addition, since Nb inhibits the growth of austenite grains when a heat treatment is performed on the electric resistance weld zone of an electric resistance welded steel pipe, Nb contributes to refining of a microstructure in the electric resistance weld zone. In order to realize such effects, it is necessary that the Nb content be 0.010% or more. On the other hand, in the case where the Nb content is more than 0.100%, since there is an increase in the amount of Nb carbonitrides precipitated, there is a deterioration in the toughness of a steel sheet, toughness in the base metal of a steel pipe, and toughness in the electric resistance weld zone of a steel pipe. Therefore, the Nb content is limited to the range of 0.010% or more and 0.100% or less, or preferably 0.030% or more and 0.070% or less.

The constituent chemical elements described above are the basic constituent chemical elements, and P: 0.030% or less, S: 0.0050% or less, Ti: 0.001% or more and 0.025% or less, Al: 0.01% or more and 0.08% or less, and Ca: 0.0005% or more and 0.0050 or less may further be added as needed in addition to the basic constituent chemical elements described above.

P: 0.030% or less

Since P tends to be segregated at grain boundaries, P deteriorates toughness. Therefore, it is preferable that the P content be as low as possible. It is acceptable that the P content be as much as 0.030% in accordance with aspects of the present invention. Therefore, the P content is limited to be 0.030% or less. Here, it is preferable that the P content be 0.002% or more, because there is an increase in refining time in the case where the P content is excessively low, which results in an increase in manufacturing costs.

S: 0.0050% or less

S deteriorates toughness as a result of forming MnS in steel. Therefore, it is preferable that the S content be as low as possible. It is acceptable that the S content be as much as 0.0050% in accordance with aspects of the present invention. Therefore, the S content is limited to be 0.0050% or less. Here, it is preferable that the S content be 0.0002% or more, because there is an increase in refining time in the case where the S content is excessively low, which results in an increase in manufacturing costs.

Ti: 0.001% or more and 0.025% or less

Ti is a chemical element which is effective for preventing the negative effect of N by combining with N to form TiN. In order to realize such an effect, it is necessary that the Ti content be 0.001% or more. On the other hand, in the case where the Ti content is more than 0.025%, since there is an increase in the amount of Ti carbonitrides precipitated along the cleavage planes of crystal grains, there is a deterioration in the toughness of a steel sheet, toughness in the base metal of a steel pipe, and toughness in the electric resistance weld zone of a steel pipe. Therefore, the Ti content is limited to the range of 0.001% or more and 0.025% or less, or preferably 0.005% or more and 0.015% or less.

Al: 0.01% or more and 0.08% or less

Al is a chemical element which functions as a deoxidizing agent, and it is necessary that the Al content be 0.01% or more in order to realize such an effect. On the other hand, in the case where the Al content is more than 0.08%, since the formation of Al oxides becomes marked, Al oxides tend to remain particularly in an electric resistance weld zone, which results in a deterioration in toughness in the electric resistance weld zone. Therefore, the Al content is limited to the range of 0.01% or more and 0.08% or less.

Ca: 0.0005% or more and 0.0050% or less

Ca is a chemical element which effectively contributes to the morphology control of sulfides such as MnS. In order to realize such an effect, it is necessary that the Ca content be 0.0005% or more. On the other hand, in the case where the Ca content is more than 0.0050%, since the effect becomes saturated, there is an economic disadvantage because an effect corresponding to the amount added cannot be expected, and there is a deterioration in toughness particularly in an electric resistance weld zone due to an increase in the amount of Ca oxides. Therefore, the Ca content is limited to the range of 0.0005% or more and 0.0050% or less, or preferably 0.0010% or more and 0.0035% or less.

One, two, or more selected from among Cu: 0.50% or less, Ni: 0.50% or less, Cr: 0.50% or less, Mo: 0.50% or less, and V: 0.10% or less may further be added as needed as selective chemical elements in addition to the constituent chemical elements described above.

One, two, or more selected from among Cu: 0.50% or less, Ni: 0.50% or less, Cr: 0.50% or less, Mo: 0.50% or less, and V: 0.10% or less Cu, Ni, Cr, Mo, and V are all chemical elements which are effective for increasing hardenability, and one, two, or more of these chemical elements may be added selectively as needed.

Cu is a chemical element which is effective for increasing strength and toughness through an increase in hardenability. In order to realize such an effect, it is preferable that the Cu content be 0.05% or more. On the other hand, in the case where the Cu content is more than 0.50%, since the effect becomes saturated, there is an economic disadvantage because an effect corresponding to the amount added cannot be expected. Therefore, in the case where Cu is added, it is preferable that the Cu content be limited to 0.50% or less, or more preferably 0.35% or less.

Ni is, like Cu, a chemical element which is effective for increasing strength and toughness through an increase in hardenability. In order to realize such an effect, it is preferable that the Ni content be 0.05% or more. On the other hand, in the case where the Ni content is more than 0.50%, since the oxidation of crystal grain boundaries becomes intense when a cast piece (slab) is heated, the occurrence of surface defects is promoted. Therefore, in the case where Ni is added, it is preferable that the Ni content be limited to 0.50% or less, or more preferably 0.35% or less.

Cr is, like Cu and Ni, a chemical element which is effective for increasing strength and improving toughness through an increase in hardenability. In order to realize such an effect, it is preferable that the Cr content be 0.05% or more. On the other hand, in the case where the Cr content is more than 0.50%, since Cr oxides are formed in an electric resistance weld zone, there is a significant deterioration in toughness in the electric resistance weld zone. Therefore, in the case where Cr is added, it is preferable that the Cr content be limited to 0.50% or less, or more preferably 0.30% or less.

Mo is, like Cu, Ni, and Cr, a chemical element which is effective for significantly increasing strength and improving toughness through an increase in hardenability. In order to realize such an effect, it is preferable that the Mo content be 0.05% or more. On the other hand, in the case where the Mo content is more than 0.50%, since a second hard phase tends to be formed in an electric resistance weld zone when the electric resistance weld zone is subjected to a heat treatment, there is a deterioration in toughness in the electric resistance weld zone. Therefore, in the case where Mo is added, it is preferable that the Mo content be limited to 0.50% or less, or more preferably 0.25% or less.

V is a chemical element which contributes to an increase in the strength of a steel sheet through solute strengthening as a result of forming a solid solution in steel and through precipitation strengthening as a result of being precipitated in the form of carbides. In order to realize such effects, it is preferable that the V content be 0.005% or more. On the other hand, in the case where the V content is more than 0.10%, since the effects become saturated, there is an economic disadvantage. Therefore, in the case where V is added, it is preferable that the V content be limited to 0.10% or less, or more preferably 0.005% or more and 0.085% or less.

The content of the constituent chemical elements described above are adjusted to be in the ranges described above and such that the condition that a carbon equivalent Ceq defined by equation (1) below is 0.25% or more and 0.50% or less is satisfied.

$$Ceq\ (\%) = C + Mn/6 + (Cr + Mo + V)/5 + (Cu + Ni)/15 \quad (1),$$

where C, Mn, Cr, Mo, V, Cu, Ni respectively represent the contents of the corresponding chemical elements (mass %).

Here, in the case where some of the chemical elements involved in equation (1) are not added, Ceq defined by equation (1) is calculated with the contents of such chemical elements being assigned a value of zero.

In the case where Ceq is less than 0.25%, since there is a decrease in hardenability, a pearlite microstructure is formed. In particular, in the case where an electric resistance weld zone having a wall thickness of 20 mm or more is cooled only from the outer surface of a steel pipe, since a (ferrite+pearlite) microstructure is formed on the inner surface of the steel pipe, there is a deterioration in toughness, and it is difficult to achieve the desired high strength in the electric resistance weld zone. Here, high strength in an electric resistance weld zone refers to a case where the tensile strength TS in the electric resistance weld zone is not lower than that in the base metal zone by 5% or more. On the other hand, in the case where Ceq is more than 0.50%, since there is a significant increase in hardenability, a martensite microstructure is formed on the outer surface of a steel pipe, and there is a deterioration in toughness.

Therefore, Ceq is limited to the range of 0.25% or more and 0.50% or less, or preferably, 0.25% or more and 0.45% or less.

The balance of the chemical composition described above consists of Fe and inevitable impurities. Here, as inevitable impurities, O (oxygen): 0.0030% or less and N: 0.0050% or less are acceptable.

In addition, a thick hot-rolled steel sheet as a raw material has the chemical composition described above and a microstructure including a bainitic ferrite phase and/or a bainite phase in every portion in the wall thickness direction. By controlling a microstructure to include a bainitic ferrite phase and/or a bainite phase in every portion in the wall thickness direction, since it is possible to obtain a thick hot-rolled steel sheet having both a high strength of 360 MPa or more in terms of yield strength and high toughness, and 0.80 mm or more in terms of critical opening displacement $\delta$ at a testing temperature of $-25°$ C. in a CTOD test, it is possible to obtain an electric resistance welded steel pipe having the desired high strength and high toughness. Here, examples of second phases other than a bainitic ferrite phase and a bainite phase include one or more of Martensite Austenaite-constituent (also called MA), residual austenite, pearlite, and martensite (P and M in Table 3). These phases may be included as long as the total amount of these phases is 5% or less in terms of area ratio.

A desirable method for manufacturing a thick hot-rolled steel sheet having the chemical composition and the microstructure described above will be described.

It is desirable that a thick hot-rolled steel sheet which is used as a raw material in accordance with aspects of the present invention be manufactured by performing a heating process including heating a steel raw material having the chemical composition described above at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and by performing a cooling process including cooling the hot-rolled steel sheet to a cooling stop temperature of 650° C. or lower at an average cooling rate of 10° C./s or more and 100° C./s or less in terms of the temperature of the central portion in the thickness direction immediately after the finishing rolling has been performed and coiling the cooled steel sheet into a coil shape.

There is no particular limitation on the kind of method used for manufacturing a steel raw material as long as a steel raw material having the chemical composition described above is manufactured. It is preferable, from the viewpoint of productivity, that molten steel having the chemical composition described above be manufactured by using an ordinary manufacturing method such as one using a converter and that the molten steel be cast into a cast piece such as a slab having specified dimensions by using an ordinary casting method such as one using a continuous casting process.

The obtained steel raw material undergoes a heating process including heating the material at a heating temperature of 1100° C. or higher and 1280° C. or lower.

Heating temperature: 1100° C. or higher and 1280° C. or lower

In the case where the heating temperature of the steel raw material is lower than 1100° C., since it is not possible to completely dissolve carbides and the like, which has been formed during continuous casting, it is not possible to achieve the desired strength for a steel sheet. On the other hand, in the case where the heating temperature is higher than 1280° C., since there is a significant increase in the grain size of austenite grains, it is not possible to achieve the desired toughness for a steel sheet. Therefore, it is preferable that the heating temperature of the steel raw material be limited to the range of 1100° C. or higher and 1280° C. or lower, or more preferably 1150° C. or higher and 1250° C. or lower. The heating temperature range described above is that for the furnace interior of a heating furnace but not that for the steel raw material.

Subsequently, the heated steel raw material undergoes a hot rolling process so as to be made into a thick hot-rolled steel sheet. The hot rolling process includes rough rolling and finishing rolling. It is not necessary to put a limitation on rough rolling conditions as long as it is possible to manufacture a sheet bar having desired dimensions. Finishing rolling is performed with a cumulative rolling reduction ratio of 20% or more in a no-recrystallization temperature range, which is equal to or higher than the $Ar_3$ transformation point and 930° C. or lower.

Cumulative rolling reduction ratio in a no-recrystallization temperature range: 20% or more In the case where the cumulative rolling reduction ratio in a no-recrystallization temperature range (equal to or higher than the $Ar_3$ transformation point and 930° C. or lower) is less than 20%, since the number of nucleation sites for bainitic ferrite is insufficient, there is coarsening of the formed microstructure, which results in a deterioration in toughness in the base metal zone of a steel pipe due to a deterioration in the toughness of a steel sheet. On the other hand, in the case where the cumulative rolling reduction ratio is more than 80%, the effect becomes saturated, and there is an increase in the load placed on a rolling mill. Therefore, it is preferable that the cumulative rolling reduction ratio in a no-recrystallization temperature range (equal to or higher than the $Ar_3$ transformation point and 930° C. or lower) in a finish rolling of a hot rolling process be limited to 20% or more, or more preferably 80% or less.

The thick hot-rolled steel sheet which has undergone a hot rolling process undergoes a cooling process on a run out table immediately, preferably within 6 seconds, after finish rolling has been performed. The cooling process includes cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

Average cooling rate in the central portion in the thickness direction: 10° C./s or more and 100° C./s or less In the case where the average cooling rate is less than 10° C./s, a ferrite phase and pearlite are partially formed in the steel sheet even in the case where hardenability-increasing chemical elements such as Cu, Ni, Cr, and Mo are contained therein, and thus it is not possible to achieve a microstructure including a bainitic ferrite phase and/or a bainite phase. On the other hand, in the case where the average cooling rate is more than 100° C./s, since a martensite phase is formed, it is not possible to achieve a microstructure including a desired bainitic ferrite phase and/or bainite phase, which results in a deterioration in toughness due to an excessive increase in strength. Therefore, it is preferable that the average cooling rate in the central portion in the thickness direction be limited to the range of 10° C./s or more and 100° C./s or less, or more preferably 10° C./s or more and 60° C./s or less.

Cooling stop temperature: 650° C. or lower

In the case where the cooling stop temperature is higher than 650° C., it is not possible to achieve the desired high strength due to a deterioration in strength because there is coarsening of precipitated particles of Nb carbonitrides and the like, and there is a deterioration in toughness in the base metal zone of a steel pipe due to a deterioration in the toughness of a steel sheet because pearlite is formed during the slow cooling stage after coiling has been performed. Therefore, it is preferable that the cooling stop temperature be limited to 650° C. or lower, or more preferably 300° C. or higher. In the case where the cooling stop temperature is lower than 300° C., since a martensite phase may be partially formed even in the case where the cooling rate is controlled to be 10° C./s or more and 100° C./s or less as described above, there is a deterioration in toughness. Therefore, it is more preferable that the cooling stop temperature be 300° C. or higher and 650° C. or lower. Here, since coiling is performed immediately after cooling has been stopped, a coiling temperature is within the temperature range described above.

By performing a pipe production process on the thick hot-rolled steel sheet as a steel raw material which has been manufactured by using the preferable manufacturing method as described above, a heavy wall electric resistance welded steel pipe having a base metal zone and an electric resistance weld zone is manufactured. With this method, it is possible to manufacture a high-strength heavy wall electric resistance welded steel pipe having both a high strength of 52 ksi or more (360 MPa or more) in terms of yield strength and high toughness, and 0.80 mm or more in terms of critical opening displacement δ at a testing temperature of −25° C. in a CTOD test in a base metal zone.

As a pipe production process, it is preferable to use an ordinary pipe production process continuously forming a steel sheet into an open pipe having an approximate circular cross-section by using plural rolls at room temperature, and then using a manufacturing apparatus for an electric resistance welded steel pipe including heating the end surfaces of the open pipe which face each other at a temperature equal to or higher than the melting point by using a high-frequency induction heating method or a high-frequency direct resistance heating method and then joining the heated end surfaces by applying pressure through squeeze rolls. Here, it is needless to say that a pipe production process is not limited to this in the present invention.

In accordance with aspects of the present invention, by using, as a raw material, a high-strength heavy wall electric resistance welded steel pipe having a base metal zone and an electric resistance weld zone having the chemical composition and the microstructure described above and having both the high strength and high toughness described above, and by performing an in-line heat treatment process on the electric resistance weld zone, a heavy wall electric resistance welded steel pipe having high toughness in the electric resistance weld zone is obtained.

In the case where a hot-rolled steel sheet having the chemical composition described above undergoes electric resistance welding, since the electric resistance weld zone is rapidly heated and then rapidly quenched during the electric resistance welding, the electric resistance weld zone has a microstructure including mainly an upper bainite phase, which is poor in terms of toughness. Therefore, in order to obtain an electric resistance weld zone having excellent toughness, it is necessary to eliminate an upper bainite phase, which is poor in terms of toughness, and to form a microstructure including a bainitic ferrite phase or a bainite phase, which is excellent in terms of toughness. Therefore, in accordance with aspects of the present invention, a heat treatment process for an electric resistance weld zone is performed on an electric resistance weld zone. A heat treatment process for an electric resistance weld zone includes a heat treatment for an electric resistance weld zone and a cooling treatment for an electric resistance weld zone.

A heat treatment for an electric resistance weld zone is performed such that every portion in the wall thickness direction of the electric resistance weld zone has a temperature of 830° C. or higher and 1150° C. or lower. Here, it is preferable that high-frequency induction heating be performed by placing plural induction heating coils at positions on the outer surface side of the steel pipe corresponding to the electric resistance weld zone. Here, it is needless to say that the structures of the heating coils and the number of heating coils placed are controlled such that it is possible to heat the electric resistance weld zone to the desired heating temperature within a specified distance in accordance with a transportation velocity.

Heating temperature of an electric resistance weld zone: 830° C. or higher and 1150° C. or lower In the case where the temperature in every portion in the wall thickness direction of an electric resistance weld zone is lower than 830° C., since it is not possible to eliminate an upper bainite phase, it is not possible to keep the desired high toughness in the electric resistance weld zone. On the other hand, in the case where the heating temperature of an electric resistance weld zone is higher than 1150° C., since there is an excessive increase in the grain size of austenite grains, a martensite phase tends to be formed due to an increase in hardenability, which results in a deterioration in toughness in the electric resistance weld zone. Therefore, the heating temperature in a heating process for an electric resistance weld zone is limited to the range of 830° C. or higher and 1150° C. or lower. In the case where a heat treatment for an electric resistance weld zone is performed by using heating coils placed on the outer surface side of a steel pipe, since temperature is distributed such that the outer surface of the electric resistance weld zone of the steel pipe has the highest temperature and that the inner surface of the electric resistance weld zone of the steel pipe has the lowest temperature, it is necessary to control supplied power and the like such that both the inner surface and the outer surface of the steel pipe both have a temperature within the temperature range described above.

Figure 3:
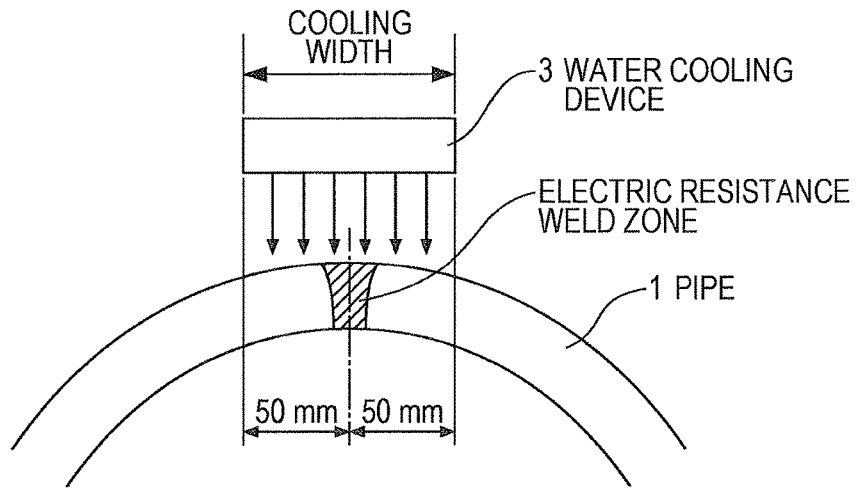
FIG. 3 is a schematic cross-sectional diagram illustrating an example of a water cooling device used for a heat treatment for an electric resistance weld zone in accordance with aspects of the present invention.

Subsequently, the heated electric resistance weld zone undergoes a cooling treatment for an electric resistance weld zone. A cooling treatment for an electric resistance weld zone is performed to a cooling stop temperature of 550° C. or lower such that an average cooling rate is 10° C./s or more and 70° C./s or less in every portion in the wall thickness direction of the electric resistance weld zone. Here, it is preferable that a cooling treatment for an electric resistance weld zone be performed, as illustrated in FIG. 3, by placing a water cooling device on the outer surface side of a steel pipe and by using cooling water.

Average cooling rate of an electric resistance weld zone: 10° C./s or more and 70° C./s or less In addition, cooling treatment for an electric resistance weld zone is performed to a cooling stop temperature of 550° C. or lower such that an average cooling rate is 10° C./s or more and 70° C./s or less in every portion in the wall thickness direction of the electric resistance weld zone. In the case where the average cooling rate is less than 10° C./s, since a (ferrite+pearlite) microstructure is formed, a fracture may occur in an electric resistance weld zone because strength is lower in the electric resistance weld zone than in the base metal zone. On the other hand, in the case where the cooling rate is more than 70° C./s, since a martensite phase is formed, there is a deterioration in toughness due to an excessive increase in hardness (strength) in the electric resistance weld zone. Therefore, in a cooling treatment for an electric resistance weld zone, the average cooling rate is limited to the range of 10° C./s or more and 70° C./s or less. Here, it is preferable that a cooling treatment for an electric resistance weld zone be performed by using cooling water. In the case of one-side cooling using cooling water from the outer surface of a steel pipe, cooling is controlled such that the cooling rate of the outer surface of the steel pipe is 70° C./s or less and the cooling rate of the inner surface of the steel pipe is 10° C./s or more.

In the case of one-side cooling using cooling water from the outer surface side of a steel pipe, it is preferable that the water cooling device (cooling nozzle) be one whose water flow rate of the cooling water is 1.2 $m^3/m^2$·min or more and 5.0 $m^3/m^2$·min or less. In the case where the water flow rate of the cooling water is less than 1.2 $m^3/m^2$·min, it is not possible to achieve the desired cooling rate. On the other hand, in the case where the water flow rate of the cooling water is more than 5.0 $m^3/m^2$·min, since the difference in temperature between the cooling surface and the opposite surface is excessively large due to excessive cooling power, problems such as camber may occur, which results in manufacturing problems.

In addition, it is preferable that a cooling width of the water cooling device (cooling nozzle) be ±50 mm or more in the circumferential direction from the center of an electric resistance weld zone. This is because cooling only a heated region in an electric resistance weld zone is not sufficient. By controlling a cooling width to be ±50 mm or more in the circumferential direction from the center of an electric resistance weld zone, since it is possible to cool regions adjacent to a heated region in an electric resistance weld zone by using cooling water, heat dissipation in the circumferential direction is promoted, which results in an increase in cooling rate on a side (rear surface) opposite to the other side (cooling surface) which is sprayed with cooling water even in the case of a heavy wall. Therefore, it is preferable that the cooling width be ±50 mm or more in the circumferential direction. With this method, it is possible to achieve the desired cooling rate even in the case of a heavy wall. Here, there is no particular limitation on the form of a water cooling device (cooling nozzle) as long as a specified cooling width is achieved.

Every portion in the wall thickness direction of the electric resistance weld zone of a heavy wall electric resistance welded steel pipe which is manufactured by using the manufacturing method described above has a microstructure including a bainitic ferrite phase and/or a bainite phase and satisfying the condition that the ratio of the average crystal grain size of a portion in the wall thickness direction having the largest grain size (the average crystal grain size of the coarsest-grain portion) to the average crystal grain size of a portion in the wall thickness direction having the smallest grain size (the average crystal grain size of the finest-grain portion), that is, (the average crystal grain size of the coarsest-grain portion)/(the average crystal grain size of the finest-grain portion) is 2.0 or less. In the case where (the average crystal grain size of the coarsest-grain portion)/(the average crystal grain size of the finest-grain portion) is more than 2.0, since a brittle fracture occurs because a crack begins to form at the coarsest-grain portion, it is not possible to achieve the desired high toughness. Therefore, (the average crystal grain size of the coarsest-grain portion)/(the average crystal grain size of the finest-grain portion) is limited to be 2.0 or less, or preferably 1.5 or less. In addition, it is preferable that the average crystal grain size of the finest-grain portion be 10 μm or less, or more preferably 8.0 μm or less, from the viewpoint of achieving satisfactory toughness. Here, by determining the average crystal grain size of every portion by using the method described below, the average crystal grain size of the coarsest-grain portion is defined as the largest average crystal grain size, and the average crystal grain size of the finest-grain portion is defined as the smallest average crystal grain size.

Here, by determining the orientation of each crystal grain in a portion located at each position (⅛t, ¼t, ½t, ¾t, ⅞t) in the wall thickness direction by using an EBSD (Electron Back Scatter Diffraction) method, and by determining grain boundaries having a rotation angle of 15° or more with adjacent crystal grains, an average crystal grain size d was determined by using the method prescribed in JIS G 0551. Here, "t" refers to a thickness in the wall thickness direction.

With this method, an electric resistance weld zone having high toughness, and 0.80 mm or more in terms of critical opening displacement δ at a testing temperature of −25° C. in a CTOD test is obtained.

Hereafter, aspects of the present invention will be described further in detail on the basis of examples.

Examples of the Invention (A) Manufacturing of a Thick Hot-Rolled Steel Sheet

Molten steels having the chemical compositions given in Table 1 were produced by using a converter and cast into slabs (steel raw materials) having a thickness of 210 mm by using a continuous casting method. The obtained steel raw materials underwent a heating process including heating the raw materials at the heating temperatures given in Table 2, a hot rolling process including rough rolling and finishing rolling performed under the conditions given in Table 2 in order to obtain hot-rolled steel sheets, and after finishing rolling has been performed, a cooling process including cooling the hot-rolled steel sheets to cooling stop temperatures given in Table 2 at the average cooling rates given in Table 2 and coiling the cooled steel sheets in a coil shape with coiling temperatures being equal to the cooling stop temperatures. Microstructure observation, a tensile test, and an impact test were performed on test pieces taken from the obtained hot-rolled steel sheet. The testing methods are as follows.

(1) Microstructure Observation

By collecting a test piece for microstructure observation from the obtained hot-rolled steel sheet, by polishing a cross section in the rolling direction (L-cross section), by performing nital etching on the polished cross section, and by observing a microstructure in a portion located at ½ of the thickness by using a scanning electron microscope at a magnification of 2000 times, microstructure photographs were obtained for two fields of view. By using the obtained microstructure photographs, the kinds of microstructures were identified, and the area ratio (fraction) of each phase was calculated by using image analysis.

(2) Tensile Test

By performing a tensile test in accordance with ASTM A 370 on a test piece taken from the obtained hot-rolled steel sheet such that a tensile direction was a direction (C-direction) at a right angle to the rolling direction, tensile properties (yield strength YS, tensile strength TS, and elongation El) were determined.

(3) Impact Test

By performing a Charpy impact test in accordance with ASTM A 370 on a V-notched test bar taken from a portion located at ½ of the thickness of the obtained hot-rolled steel sheet such that the longitudinal direction of the test bar was a direction (C-direction) at a right angle to the rolling direction, a fracture transition temperature vTrs (° C.) was determined.

The obtained results are given in Table 3.

TABLE 1

| Steel No. | Chemical Composition (mass %) | | | | | | | | | | |
|---|---|---|---|---|---|---|---|---|---|---|---|
| | C | Si | Mn | P | S | Al | Nb | Ti | Cu, Ni, Cr, Mo, V | Ca | Ceq |
| A | 0.04 | 0.17 | 1.28 | 0.012 | 0.0030 | 0.042 | 0.013 | 0.008 | — | — | 0.25 |
| B | 0.07 | 0.24 | 1.36 | 0.020 | 0.0030 | 0.047 | 0.045 | 0.016 | V: 0.04 | 0.0022 | 0.30 |
| C | 0.04 | 0.14 | 1.10 | 0.006 | 0.0005 | 0.037 | 0.045 | 0.009 | Cr: 0.2, V: 0.06 | 0.0023 | 0.28 |
| D | 0.04 | 0.22 | 1.60 | 0.014 | 0.0020 | 0.038 | 0.058 | 0.015 | Cu: 0.3, Ni: 0.3, Mo: 0.2 V: 0.03 | — | 0.39 |
| E | 0.07 | 0.20 | 1.75 | 0.011 | 0.0018 | 0.035 | 0.060 | 0.017 | Cr: 0.3, V: 0.06 | 0.0025 | 0.42 |
| F | 0.05 | 0.10 | 0.80 | 0.025 | 0.0042 | 0.030 | 0.015 | 0.010 | — | — | 0.18 |
| G | 0.09 | 0.35 | 1.85 | 0.010 | 0.0034 | 0.027 | 0.050 | 0.065 | Cr: 0.4, Mo: 0.3, V: 0.02 | — | 0.53 |

TABLE 2

| | | Hot Rolling Process | | | | | |
|---|---|---|---|---|---|---|---|
| | | Heating | Cumulative | | Cooling Process | | |
| Steel Sheet No. | Steel No. | Process Heating Temperature (° C.) | Rolling Reduction Ratio *(%) | Finisher Delivery Temperature **(° C.) | Average Cooling Rate ***(° C./s) | Cooling Stop Temperature **(° C.) | Thickness (mm) |
| 1 | A | 1180 | 30 | 830 | 25 | 545 | 25.4 |
| 2 | B | 1200 | 35 | 820 | 32 | 580 | 23.8 |
| 3 | C | 1210 | 45 | 800 | 30 | 500 | 22.2 |
| 4 | D | 1230 | 40 | 800 | 32 | 480 | 20.6 |
| 5 | E | 1210 | 65 | 790 | 25 | 530 | 25.0 |

TABLE 2-continued

| | | Hot Rolling Process | | | | | |
|---|---|---|---|---|---|---|---|
| | | Heating | Cumulative | | Cooling Process | | |
| Steel Sheet No. | Steel No. | Process Heating Temperature (° C.) | Rolling Reduction Ratio *(%) | Finisher Delivery Temperature **(° C.) | Average Cooling Rate ***(° C./s) | Cooling Stop Temperature **(° C.) | Thickness (mm) |
| 6 | F | 1120 | 30 | 820 | 25 | 520 | 25.4 |
| 7 | G | 1250 | 70 | 780 | 32 | 400 | 20.6 |
| 8 | C | 1200 | 15 | 840 | 25 | 700 | 25.4 |
| 9 | C | 1200 | 45 | 800 | 5 | 480 | 23.8 |
| 10 | E | 1200 | 45 | 800 | 25 | 680 | 22.2 |
| 11 | E | 1200 | 10 | 840 | 25 | 550 | 22.2 |

*) rolling reduction ratio in a temperature range of 930° C. or lower and equal to or higher than the $Ar_3$ point
**) surface temperature
***) temperature in the central portion in the thickness direction

TABLE 3

| | | Microstructure* | | Tensile Property* | | | |
|---|---|---|---|---|---|---|---|
| Steel Sheet No. | Steel No. | Kind** | BF/B Proportion (area %) | Yield Strength YS (MPa) | Tensile Strength TS (MPa) | Elongation El (%) | Toughness* vTrs (° C.) |
| 1 | A | BF + P | 96 | 432 | 511 | 46 | −95 |
| 2 | B | BF + P | 98 | 477 | 561 | 42 | −85 |
| 3 | C | BF | 100 | 524 | 599 | 41 | −110 |
| 4 | D | BF | 100 | 540 | 623 | 36 | −120 |
| 5 | E | BF + M | 98 | 604 | 696 | 32 | −120 |
| 6 | F | F + BF | 90 | 326 | 389 | 50 | −70 |
| 7 | G | BF + M | 92 | 584 | 828 | 25 | −90 |
| 8 | C | F + P | — | 385 | 470 | 49 | −50 |
| 9 | C | F + P | — | 397 | 486 | 48 | −55 |
| 10 | E | F + P | — | 563 | 670 | 36 | −60 |
| 11 | E | BF + M | 96 | 610 | 704 | 33 | −60 |

*) in the central portion in the thickness direction
**) BF: bainitic ferrite, B: bainite, F: polygonal ferrite, M: martensite, P: pearlite Any one of the hot-rolled steel sheets which were manufactured within the preferable ranges according to aspects of the present invention was a thick hot-rolled steel sheet having a microstructure including a bainitic ferrite phase and/or a bainite phase, a high strength of 360 MPa or more in terms of yield strength YS, and a high toughness of −45° C. or lower in terms of fracture transition temperature vTrs in a Charpy impact test.

(B) Manufacturing of a Heavy Wall Electric Resistance Welded Steel Pipe

By using a part of the thick hot-rolled steel sheet manufactured in (A) as a raw material, and by using an ordinary pipe production process continuously forming the steel sheet into an open pipe having an approximate circular cross-section by using plural rolls at room temperature, then using a manufacturing apparatus for an electric resistance welded steel pipe including heating the end surfaces facing each other of the open pipe at a temperature equal to or higher than the melting point by using a high-frequency induction heating method or a high-frequency resistance heating method, and then joining the heated end surfaces by applying pressure through squeeze rolls. As a result, heavy wall electric resistance welded steel pipes having dimensions given in Table 4 were obtained.

The electric resistance weld zone of the obtained heavy wall electric resistance welded steel pipe underwent a heat treatment for an electric resistance weld zone including a heat treatment and a cooling treatment performed under the conditions given in Table 4 by using an induction heating means having plural induction heating devices for a heat treatment for an electric resistance weld zone placed on the outer side of the steel pipe in line on the exit side of the manufacturing apparatus for an electric resistance welded steel pipe and a cooling means (water cooling unit) having plural water cooling devices (cooling nozzles) placed on the exit side of the induction heating means.

Microstructure observation, a tensile test, an impact test, and a CTOD test were performed on test pieces taken from the base metal zone and electric resistance weld zone of the obtained heavy wall electric resistance welded steel pipe. The testing methods are as follows.

(B1) Microstructure Observation

By collecting test pieces for microstructure observation from the base metal zone and electric resistance weld zone of the obtained electric resistance welded steel pipe, by polishing a cross section in the longitudinal direction of the steel pipe (L-cross section), by performing nital etching on the polished cross section, and by observing a microstructure in a portion located at each position (⅛t, ¼t, ½t, ¾t, ⅞t) in the wall thickness direction by using a scanning electron microscope at a magnification of 2000 times, microstructure photographs were obtained for two fields of view for each portion.

By using the obtained microstructure photographs, the kinds of microstructures were identified, and the area ratio of each phase was calculated by using image analysis. Here, as to electric resistance weld zone, by determining the orientation of each crystal grain by using an EBSD (Electron Back Scatter Diffraction) method, by determining grain boundaries having a rotation angle of 15° or more with adjacent crystal grains, and by determining the average distance of the adjacent crystal grain boundaries by using a method of section, the average crystal grain size of each portion in the wall thickness direction was defined as the average distance. By using the obtained average crystal grain size of each portion in the wall thickness direction, the coarsest-grain portion and the finest-grain portion were determined, and the ratio between the average crystal grain sizes of these portions, that is, (the average crystal grain size of the coarsest-grain portion)/(the average crystal grain size of the finest-grain portion) was calculated.

(B2) Tensile Test

By performing a tensile test in accordance with ASTM A 370 on a test piece taken from the portion placed at the position of 90° (at 3 o'clock under the assumption that the electric resistance weld zone is placed at 12 o'clock) of the obtained electric resistance welded steel pipe such that a tensile direction was the circumferential direction, tensile properties (yield strength YS, tensile strength TS, and elongation El) of the base metal zone were determined. In addition, a tensile test piece was taken from the electric resistance weld zone of the obtained electric resistance welded steel pipe as done from the base metal zone, the tensile properties (tensile strength TS) of the electric resistance weld zone were determined.

(B3) Impact Test

By performing a Charpy impact test in accordance with ASTM A 370 on a V-notched test bar taken from a portion located at ½ of the wall thickness of the obtained electric resistance welded steel pipe such that the longitudinal direction of the test bar was the circumferential direction, a fracture transition temperature vTrs (° C.) was determined.

(B4) CTOD Test

A CTOD test piece was taken from the base metal zone and electric resistance weld zone of the obtained electric resistance welded steel pipe such that the longitudinal direction of the test piece was the circumferential direction. A CTOD test was performed in accordance with BS 7448 at a testing temperature of −25° C. on the obtained test piece in order to determine a critical opening displacement δ. Here, values calculated by using equation (2) below were used for the yield stresses $\sigma_Y$ of the base metal zone and the electric resistance weld zone at a testing temperature of −25° C., which were necessary to calculate opening displacement δ.

$$\sigma_Y = \sigma_0 \exp((481.4 - 66.5 \ln \sigma_0)/(1/(T+273) - 1/273)) \quad (2),$$

where $\sigma_0$ represents yield stress (MPa) at room temperature and T represents a testing temperature (° C.).

The obtained results are given in Table 5 (Table 5 is formed by a combination of Table 5-1 and Table 5-2).

TABLE 4

| Steel Pipe No. | Steel Sheet No. | Steel Pipe Size (Outer Diameter mm φ) | Water Cooling Device Cooling Width (mm) | Water Flow Rate (m³/m²·min) | Outer Surface of Pipe Heating Temperature (° C.) | Outer Surface of Pipe Average Cooling Rate* (° C./s) | Outer Surface of Pipe Cooling Stop Temperature (° C.) | Inner Surface of Pipe Heating Temperature (° C.) | Inner Surface of Pipe Average Cooling Rate** (° C./s) | Inner Surface of Pipe Cooling Stop Temperature (° C.) | Note |
|---|---|---|---|---|---|---|---|---|---|---|---|
| P1 | 1 | 508 | ±50 | 2.5 | 1120 | 65 | 180 | 880 | 28 | 390 | Example |
| P2 | 2 | 610 | ±50 | 2.0 | 1100 | 60 | 200 | 900 | 24 | 380 | Example |
| P3 | 3 | 610 | ±50 | 2.0 | 1070 | 60 | 200 | 890 | 24 | 360 | Example |
| P4 | 3 | 610 | ±50 | 2.0 | 1080 | 60 | 210 | 900 | 24 | 370 | Example |
| P5 | 3 | 610 | ±50 | 1.0 | 1100 | 40 | 300 | 930 | 7 | 600 | Comparative Example |
| P6 | 4 | 660 | ±50 | 1.6 | 1080 | 55 | 250 | 930 | 18 | 380 | Example |
| P7 | 5 | 508 | ±50 | 1.3 | 1080 | 50 | 250 | 860 | 15 | 400 | Example |
| P8 | 5 | 508 | ±50 | 1.3 | 1080 | 50 | 240 | 880 | 15 | 400 | Example |
| P9 | 5 | 508 | ±50 | 1.3 | 1080 | 50 | 230 | 870 | 5 | 700 | Comparative Example |
| P10 | 6 | 508 | ±50 | 3.0 | 1130 | 65 | 180 | 950 | 33 | 360 | Comparative Example |
| P11 | 7 | 457 | ±50 | 1.2 | 1050 | 50 | 240 | 870 | 23 | 350 | Comparative Example |
| P12 | 8 | 508 | ±50 | 2.0 | 1100 | 60 | 220 | 900 | 24 | 650 | Comparative Example |
| P13 | 9 | 508 | ±50 | 2.0 | 1080 | 60 | 210 | 880 | 25 | 300 | Comparative Example |
| P14 | 10 | 508 | ±50 | 1.3 | 1060 | 50 | 260 | 860 | 16 | 380 | Comparative Example |
| P15 | 11 | 508 | ±50 | 1.3 | 1080 | 50 | 240 | 870 | 16 | 380 | Comparative Example |

*) average in a temperature range of 800° C. to 500° C.
**) average in a temperature range of 750° C. to 650° C.

TABLE 5-1

| | | | Base Metal Zone | | | | | |
|---|---|---|---|---|---|---|---|---|
| | | | Tensile Property | | | Toughness | | |
| Steel Pipe No. | Steel Sheet No. | Steel No. | YS (MPa) | TS (MPa) | El (%) | CTOD δ (mm) | vTrs (° C.) | Note |
| P1 | 1 | A | 450 | 525 | 45 | 1.08 | −75 | Example |
| P2 | 2 | B | 501 | 581 | 40 | 1.02 | −60 | Example |
| P3 | 3 | C | 546 | 615 | 40 | 1.11 | −90 | Example |
| P4 | 3 | C | 555 | 619 | 39 | 1.09 | −85 | Example |
| P5 | 3 | C | 544 | 617 | 39 | 1.03 | −85 | Comparative Example |
| P6 | 4 | D | 558 | 641 | 34 | 1.20 | −110 | Example |
| P7 | 5 | E | 628 | 708 | 30 | 1.10 | −105 | Example |
| P8 | 5 | E | 620 | 716 | 30 | 1.15 | −100 | Example |
| P9 | 5 | E | 620 | 714 | 30 | 1.13 | −105 | Comparative Example |
| P10 | 6 | F | 350 | 401 | 49 | 0.82 | −55 | Comparative Example |
| P11 | 7 | G | 604 | 844 | 25 | 0.98 | −75 | Comparative Example |
| P12 | 8 | C | 401 | 482 | 49 | 0.33 | −30 | Comparative Example |
| P13 | 9 | C | 415 | 502 | 47 | 0.28 | −30 | Comparative Example |
| P14 | 10 | E | 585 | 684 | 35 | 0.40 | −40 | Comparative Example |
| P15 | 11 | E | 620 | 718 | 33 | 0.42 | −40 | Comparative Example |

TABLE 5-2

| Steel Pipe No. | Steel Sheet No. | Steel No. | Kind in Portion in Wall Thickness Direction* | | | | | Average Crystal Grain Size in Finest-Grain Portion (μm) | (Average Grain Size in Coarsest-Grain Portion)/(Average Grain Size in Finest-Grain Portion) | Tensile Property TS (MPa) | Toughness CTOD δ (mm) | Toughness vTrs (° C.) | Note |
|---|---|---|---|---|---|---|---|---|---|---|---|---|---|
| | | | 1/8 t | 1/4 t | 1/2 t | 3/4 t | 7/8 t | | | | | | |
| P1 | 1 | A | B | BF | BF | BF | BF | 8.0 | 1.3 | 540 | 1.02 | −60 | Example |
| P2 | 2 | B | B | BF | BF | BF | BF | 6.0 | 1.3 | 598 | 1.12 | −85 | Example |
| P3 | 3 | C | BF | BF | BF | BF | BF | 5.5 | 1.3 | 618 | 1.14 | −90 | Example |
| P4 | 3 | C | BF | BF | BF | BF | BF | 5.5 | 1.3 | 630 | 1.08 | −90 | Example |
| P5 | 3 | C | B | BF | F + P | F + P | F + P | 5.0 | 2.2 | 578 | 0.13 | −35 | Comparative Example |
| P6 | 4 | D | B | BF | BF | BF | BF | 4.5 | 1.3 | 650 | 1.11 | −100 | Example |
| P7 | 5 | E | B | BF | BF | BF | BF | 3.5 | 1.7 | 712 | 1.19 | −120 | Example |
| P8 | 5 | E | B | BF | BF | BF | BF | 4.0 | 1.5 | 733 | 1.15 | −110 | Example |
| P9 | 5 | E | B | BF | F + P | F + P | F + P | 10.5 | 2.4 | 661 | 0.09 | −40 | Comparative Example |
| P10 | 6 | F | BF | BF + F + P | F + P | F + P | F + P | 12.0 | 2.8 | 374 | 0.05 | −20 | Comparative Example |
| P11 | 7 | G | M | M | M + B | B | BF | 12.5 | 2.8 | 889 | 0.04 | −15 | Comparative Example |
| P12 | 8 | C | B | BF + F + P | F + P | F + P | F + P | 11.5 | 2.6 | 480 | 0.11 | −25 | Comparative Example |
| P13 | 9 | C | M + B | M + B | B | BF | BF | 13.0 | 3.0 | 537 | 0.03 | −10 | Comparative Example |
| P14 | 10 | E | B | BF | BF | BF | BF | 6.5 | 1.6 | 690 | 1.04 | −80 | Comparative Example |
| P15 | 11 | E | BF | BF | BF | UB | UB | 10.0 | 2.5 | 720 | 0.05 | −35 | Comparative Example |

*) M: martensite, B: bainite, UB: upper bainite, BF: bainitic ferrite, F: ferrite, P: pearlite Any one of the examples of the present invention was a heavy wall electric resistance welded steel pipe having a base metal zone having a microstructure including a bainitic ferrite phase and/or a bainite phase, a high strength of 360 MPa or more in terms of yield strength YS, and high toughness, and 0.80 mm or more in terms of critical opening displacement δ at a testing temperature of −25° C. in a CTOD test and an electric resistance weld zone having a microstructure including a bainitic ferrite phase and/or a bainite phase in every portion in the wall thickness direction and high toughness, and 0.80 mm or more in terms of critical opening displacement δ at a testing temperature of −25° C. in a CTOD test. On the other hand, in the case of the comparative examples, which were outside of the preferred range according to aspects of the present invention, there was a deterioration in toughness in an electric resistance weld zone.

The invention claimed is:

1. A heavy wall electric resistance welded steel pipe for a line pipe, the steel pipe being a heavy wall electric resistance welded steel pipe which is formed from a thick hot-rolled steel sheet as a raw material and which has a base metal zone and an electric resistance weld zone, wherein the base metal zone has a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less and satisfying the condition that a carbon equivalent Ceq defined by equation (1) below is 0.25% or more and 0.50% or less, and a microstructure consisting of a bainitic ferrite phase and/or a bainite phase and a second phase of Martensite-Austenite constituent, residual austenite, pearlite, martensite, or combinations thereof, the second phase being present in an amount of 5% or less in terms of area ratio, wherein the base metal zone has a high strength of 360 MPa or more in terms of yield strength and a high toughness of −45° C. or lower in terms of fracture transition temperature vTrs in a Charpy impact test, wherein the electric resistance weld zone has a microstructure including a bainitic ferrite phase and/or a bainite phase and satisfying the condition that the ratio of the average crystal grain size of a portion in the wall thickness direction having the largest grain size to the average crystal grain size of a portion in the wall thickness direction having the smallest grain size, that is, (the average crystal grain size of the coarsest-grain portion)/(the average crystal grain size of the finest-grain portion) is 2.0 or less, and wherein the electric resistance weld zone has high toughness, and 0.80 mm or more in terms of critical opening displacement δ at a testing temperature of −25° C. in a CTOD test:

$$Ceq\ (\%) = C + Mn/6 + (Cr + Mo + V)/5 + (Cu + Ni)/15 \qquad (1),$$

where C, Mn, Cr, Mo, V, Cu, Ni respectively represent the contents of the corresponding chemical elements (mass %).

2. The heavy wall electric resistance welded steel pipe for a line pipe according to claim 1, wherein the average crystal grain size of the finest-grain portion is 10 μm or less.

3. The heavy wall electric resistance welded steel pipe for a line pipe according to claim 1, wherein the chemical composition further contains, by mass %, P: 0.030%/a or less, S: 0.0050% or less, Ti: 0.001% or more and 0.025% or less, Al: 0.01% or more and 0.08% or less, Ca: 0.0005% or more and 0.0050% or less, and the balance being Fe and inevitable impurities.

4. The heavy wall electric resistance welded steel pipe for a line pipe according to claim 3, wherein the average crystal grain size of the finest-grain portion is 10 μm or less.

5. The heavy wall electric resistance welded steel pipe for a line pipe according to claim 3, wherein the chemical composition further contains, by mass %, one, two, or more selected from among Cu: 0.5% or less, Ni: 0.5% or less, Cr: 0.5% or less, Mo: 0.5% or less, and V: 0.10% or less.

6. The heavy wall electric resistance welded steel pipe for a line pipe according to claim 5, wherein the average crystal grain size of the finest-grain portion is 10 μm or less.

7. A method for manufacturing a heavy wall electric resistance welded steel pipe for a line pipe, the method being a method for manufacturing a heavy wall electric resistance welded steel pipe including using a heavy wall electric resistance welded steel pipe as a starting material and performing an in-line heat treatment process for an electric resistance weld zone on the electric resistance weld zone of the heavy wall electric resistance welded steel pipe, wherein the heavy wall electric resistance welded steel pipe as the starting material is a high-strength heavy wall electric resistance welded steel pipe having a chemical composition containing, by mass %, C: 0.02% or more and 0.10% or less, Si: 0.05% or more and 0.30% or less, Mn: 0.80% or more and 2.00% or less, and Nb: 0.010% or more and 0.100% or less and satisfying the condition that a carbon equivalent Ceq defined by equation (1) below is 0.25% or more and 0.50% or less, a microstructure consisting of a bainitic ferrite phase and/or a bainite phase and a second phase of Martensite-Austenite constituent, residual austenite, pearlite, martensite, or combinations thereof, the second phase being present in an amount of 5% or less in terms of area ratio, in every portion in the wall thickness direction, and having a high strength of 360 MPa or more in terms of yield strength and a high toughness of −45° C. or lower in terms of fracture transition temperature vTrs in a Charpy impact test in every portion in the wall thickness direction, wherein the heat treatment process for an electric resistance weld zone is a process including performing a heat treatment for an electric resistance weld zone such that every portion in the wall thickness direction of the electric resistance weld zone has a temperature of 850° C. or higher and 1150° C. or lower and performing a cooling treatment for an electric resistance weld zone to a cooling stop temperature of 550° C. or lower such that an average cooling rate is 10° C./s or more and 70° C./s or less in every portion in the wall thickness direction of the electric resistance weld zone, and wherein the electric resistance weld zone has high toughness, and 0.80 mm or more in terms of critical opening displacement δ at a testing temperature of −25° C. in a CTOD test:

$$Ceq\ (\%) = C + Mn/6 + (Cr + Mo + V)/5 + (Cu + Ni)/15 \qquad (1),$$

where C, Mn, Cr, Mo, V, Cu, Ni respectively represent the contents of the corresponding chemical elements (mass %).

8. The method for manufacturing a heavy wall electric resistance welded steel pipe for a line pipe according to claim 7, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

9. The method for manufacturing a heavy wall electric resistance welded steel pipe for a line pipe according to claim 7, wherein the chemical composition further contains, by mass %, P: 0.030% or less, S: 0.0050% or less, Ti: 0.001% or more and 0.025% or less, Al: 0.01% or more and 0.08% or less, Ca: 0.0005% or more and 0.0050% or less, and the balance being Fe and inevitable impurities.

10. The method for manufacturing a heavy wall electric resistance welded steel pipe for a line pipe according to claim 9, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

11. The method for manufacturing a heavy wall electric resistance welded steel pipe for a line pipe according to claim 9, wherein the chemical composition further contains, by mass %, one, two, or more selected from among Cu: 0.5% or less, Ni: 0.5% or less, Cr: 0.5% or less, Mo: 0.5% or less, and V: 0.10% or less.

12. The method for manufacturing a heavy wall electric resistance welded steel pipe for a line pipe according to claim 11, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

13. The method for manufacturing a heavy wall electric resistance welded steel pipe for a line pipe according to claim 7, wherein the heat treatment process for an electric resistance weld zone is a process using an induction heating device and a water cooling device which are placed on the outer surface side of the heavy wall electric resistance welded steel pipe, wherein the heat treatment for an electric resistance weld zone is a treatment including performing heating such that an outer surface temperature of the steel pipe is 1150° C. or lower and such that an inner surface temperature of the steel pipe is 830° C. or higher, and wherein the cooling treatment for an electric resistance weld zone is a treatment including performing cooling such that an average cooling rate is 70° C./s or less in terms of outer surface temperature of the steel pipe when an outer surface temperature of the steel pipe is 800° C. or lower and 500° C. or higher and such that an average cooling rate is 10° C./s or more in terms of inner surface temperature of the steel pipe when an inner surface temperature of the steel pipe is 750° C. or lower and 650° C. or higher.

14. The method for manufacturing a heavy wall electric resistance welded steel pipe for a line pipe according to claim 13, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

15. The method for manufacturing a heavy wall electric resistance welded steel pipe for a line pipe according to claim 13, wherein the chemical composition further contains, by mass %, P: 0.030% or less, S: 0.0050% or less, Ti: 0.001% or more and 0.025% or less, Al: 0.01% or more and 0.08% or less, Ca: 0.0005% or more and 0.0050% or less, and the balance being Fe and inevitable impurities.

16. The method for manufacturing a heavy wall electric resistance welded steel pipe for a line pipe according to claim 15, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

17. The method for manufacturing a heavy wall electric resistance welded steel pipe for a line pipe according to claim 15, wherein the chemical composition further contains, by mass %, one, two, or more selected from among Cu: 0.5% or less, Ni: 0.5% or less, Cr: 0.5% or less, Mo: 0.5% or less, and V: 0.10% or less.

18. The method for manufacturing a heavy wall electric resistance welded steel pipe for a line pipe according to claim 17, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

19. The method for manufacturing a heavy wall electric resistance welded steel pipe for a line pipe according to claim 13, wherein the cooling device is a device using cooling water, wherein a water flow rate of the cooling water is 1.2 m³/m² min or more and 5.0 m³/m² min or less, and wherein the cooling width is ±50 mm or more in the circumferential direction from the center of the electric resistance weld zone.

20. The method for manufacturing a heavy wall electric resistance welded steel pipe for a line pipe according to claim 19, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

21. The method for manufacturing a heavy wall electric resistance welded steel pipe for a line pipe according to claim 19, wherein the chemical composition further contains, by mass %, P: 0.030% or less, S: 0.0050% or less, Ti: 0.001% or more and 0.025% or less, Al: 0.01% or more and 0.08% or less, Ca: 0.0005% or more and 0.0050% or less, and the balance being Fe and inevitable impurities.

22. The method for manufacturing a heavy wall electric resistance welded steel pipe for a line pipe according to claim 21, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

23. The method for manufacturing a heavy wall electric resistance welded steel pipe for a line pipe according to claim 21, wherein the chemical composition further contains, by mass %, one, two, or more selected from among Cu: 0.5% or less, Ni: 0.5% or less, Cr: 0.5% or less, Mo: 0.5% or less, and V: 0.10% or less.

24. The method for manufacturing a heavy wall electric resistance welded steel pipe for a line pipe according to claim 23, wherein the high-strength heavy wall electric resistance welded steel pipe is an electric resistance welded steel pipe which is formed from a high-strength thick hot-rolled steel sheet as a raw material, and wherein the high-strength thick hot-rolled steel sheet is manufactured by performing a heating process including heating a steel raw material having the chemical composition at a heating temperature of 1100° C. or higher and 1280° C. or lower, by performing a hot rolling process including rough rolling and finishing rolling with a cumulative rolling reduction ratio of 20% or more in a no-recrystallization temperature range, which is equal to or higher than the $Ar_3$ transformation point and 930° C. or lower, and after the finishing rolling has been performed, by performing a cooling process including cooling the hot-rolled steel sheet to a cooling stop temperature of 650° C. or lower at an average cooling rate of 10° C./s or more and 100° C./s or less in terms of the temperature of the central portion in the thickness direction and coiling the cooled steel sheet into a coil shape.

* * * * *